Jan. 16, 1945. S. B. WINN 2,367,550
TRACTOR TRAILER ASSEMBLY
Filed Aug. 3, 1942 3 Sheets-Sheet 1
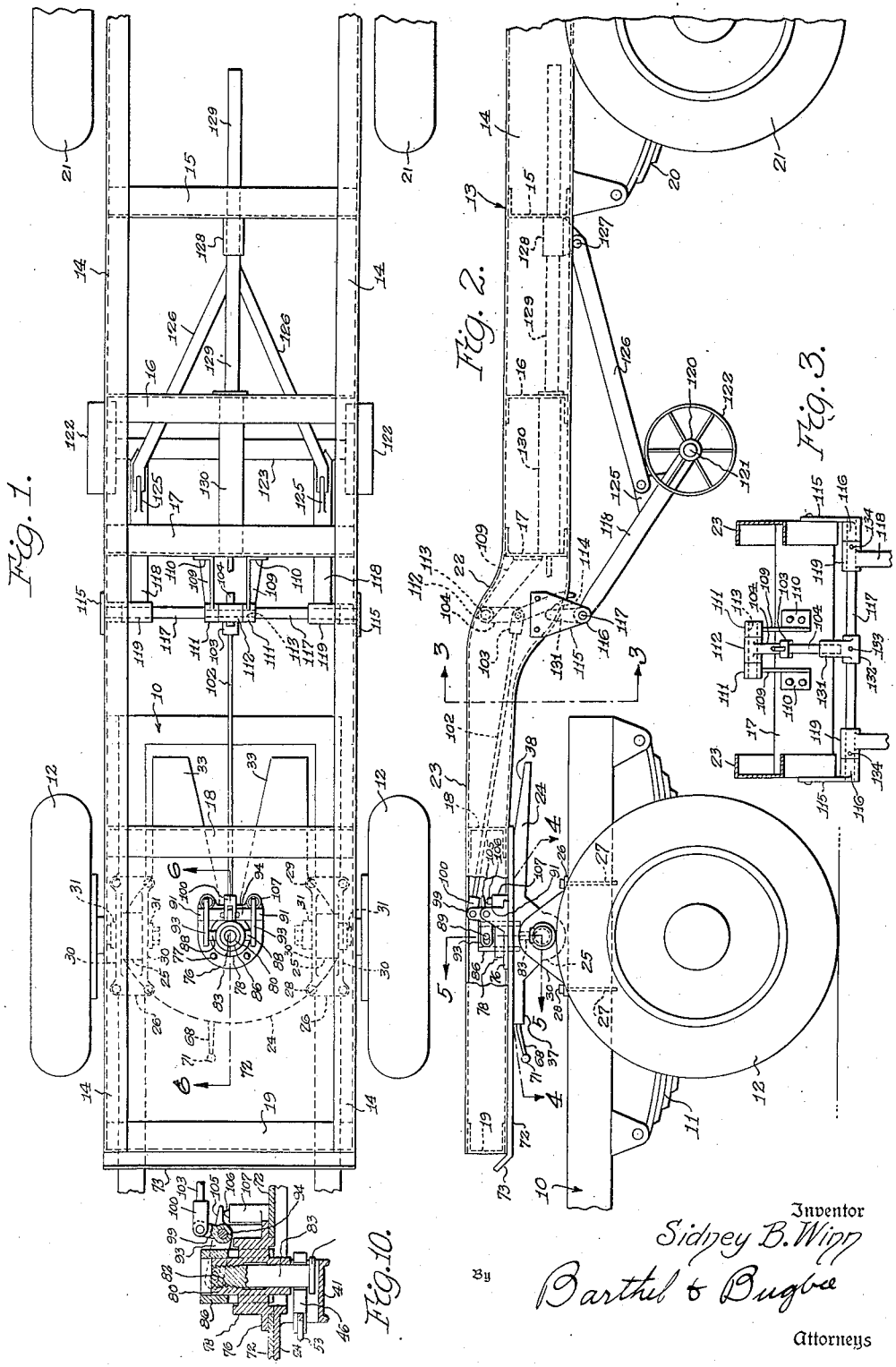
Inventor
Sidney B. Winn
By Barthel & Bugbee
Attorneys Jan. 16, 1945.    S. B. WINN    2,367,550
TRACTOR TRAILER ASSEMBLY
Filed Aug. 3, 1942    3 Sheets-Sheet 2
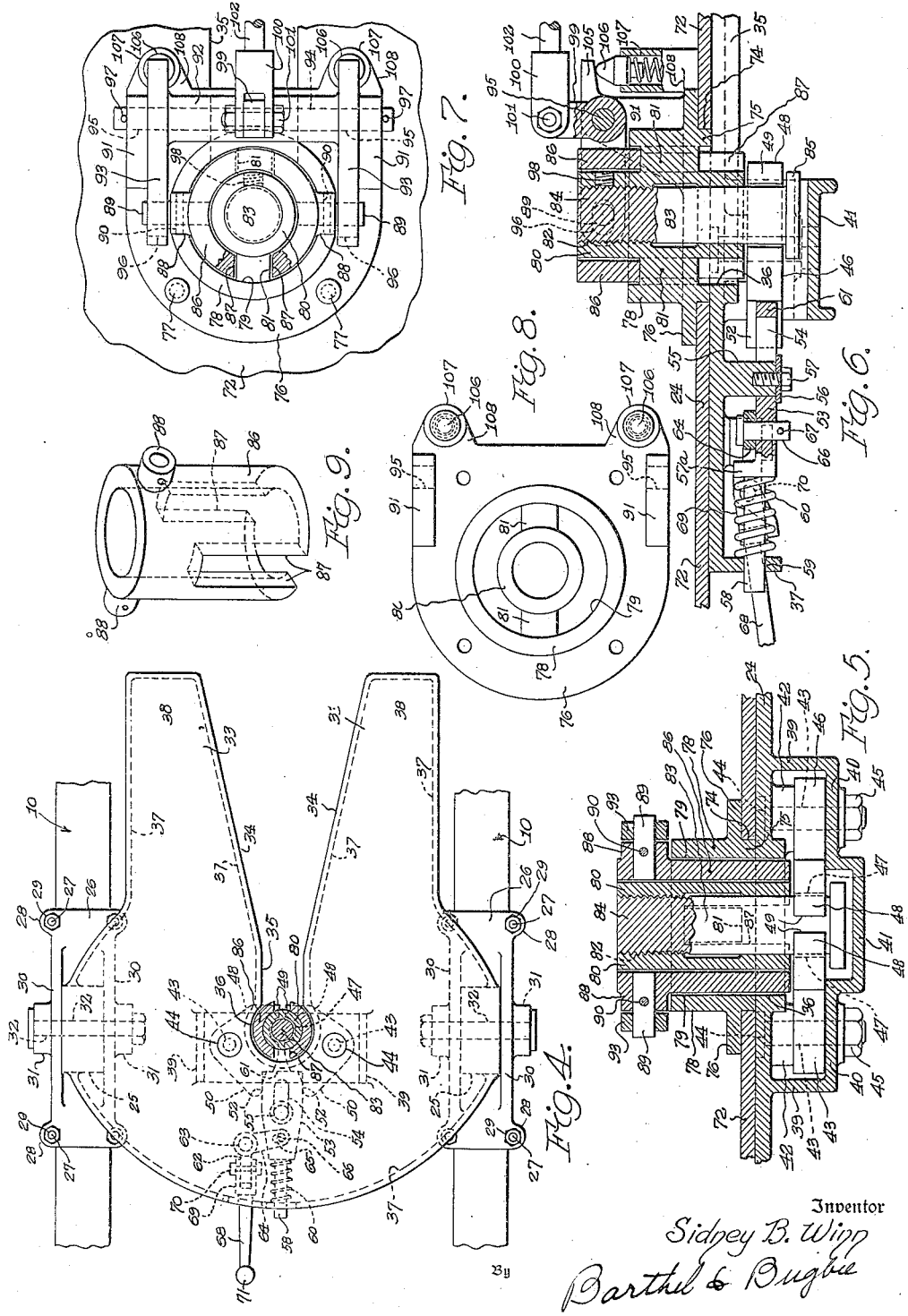
Inventor
Sidney B. Winn
By Barthel & Bugbee
Attorneys Jan. 16, 1945. S. B. WINN 2,367,550
TRACTOR TRAILER ASSEMBLY
Filed Aug. 3, 1942  3 Sheets-Sheet 3
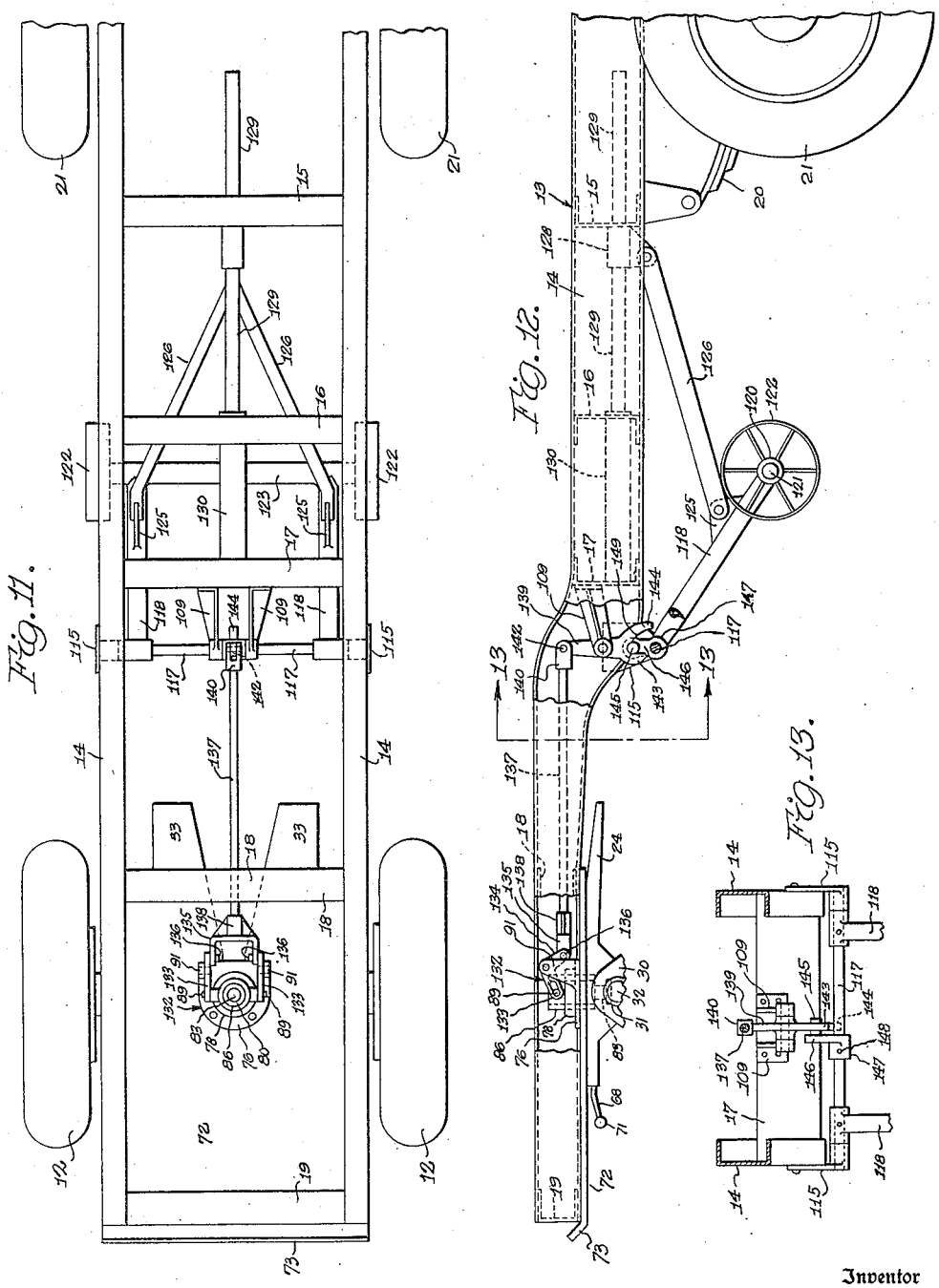
Inventor
Sidney B. Winn
By Barthel & Bugbee
Attorneys Patented Jan. 16, 1945

2,367,550

UNITED STATES PATENT OFFICE 2,367,550

TRACTOR TRAILER ASSEMBLY

Sidney B. Winn, Lapeer, Mich.

Application August 3, 1942, Serial No. 453,349

17 Claims. (Cl. 280—33.1)

The present invention relates to tractor-trailer combinations, and more particularly, to a safety fifth wheel coupling therefor.

The primary object of the invention is to provide a coupling for articulated vehicles whereby the vehicles will be maintained in draft relationship upon failure of the main coupling and the accidental separation of the component coupling elements will be eliminated while the articulated vehicle is in transit.

Another object of the invention is to provide a coupling for articulated vehicles which is controlled by the lowering and elevation of the trailer prop to facilitate the easy coupling and uncoupling of the component coupling elements without requiring additional work on the part of the operator.

Another object of the invention is to provide a coupling of the above-mentioned character in which a locking sleeve is movably mounted on the king pin adapted to be projected and retracted to its respective locking and unlocking positions by operation of the trailer props so that the coupling sleeve will be automatically operated during the coupling and uncoupling of the tractor-trailer combination.

Another object of the invention resides in providing a locking sleeve of the above-mentioned character which will receive most of the stresses and strains on the coupling or fifth wheel connection upon failure of the king pin connection and thereby relieve the king pin of considerable wear resulting from such stressing and straining at the fifth wheel connection.

Another object of the invention is to provide a fifth wheel coupling for tractor trailer assemblies wherein it will be impossible to separate the tractor from the trailer unless the trailer prop is in its trailer supporting position.

Another object of the invention is to provide a coupling for tractor trailer assemblies in which the king pin will be protected against shearing, particularly when the trailer tends to over-ride the tractor in case of a head-on collision.

Other objects and advantages of the invention will become apparent during the course of the following description of the accompanying drawings wherein:

Figure 1 is a top plan view of a trailer-tractor assembly illustrating one embodiment of the invention;

Figure 2 is a side elevational view partly broken away further showing the details of construction of the tractor-trailer assembly adjacent the fifth wheel coupling thereof;

Figure 3 is a vertical cross sectional view taken on line 3—3 of Figure 2 looking in the direction of the arrows showing a trailer-prop and its connections with the fifth wheel coupling sleeve;

Figure 4 is an enlarged fragmentary top elevational view of the fifth wheel elements illustrating the manner in which the invention is applied thereto;

Figure 5 is a vertical cross-sectional view taken on line 5—5 of Figure 2 looking in the direction of the arrows, further illustrating the invention in detail;

Figure 6 is a vertical longitudinal cross-sectional view taken on line 6—6 of Figure 1 looking in the direction of the arrows illustrating the details of the invention and showing the locking sleeve in operative position;

Figure 7 is an enlarged fragmentary top elevational view of the king pin and locking sleeve showing the control linkage therefor;

Figure 8 is a similar view showing the linkage removed to more clearly illustrate the structure of the casting;

Figure 9 is a perspective view of the locking sleeve showing the general construction and arrangement thereof;

Figure 10 is a vertical cross-sectional view similar to Figure 6 illustrating the locking sleeve in its elevated or inoperative position;

Figure 11 is a top plan view of a modified form of the invention showing a different prop and locking sleeve linkage;

Figure 12 is a side elevational view of the form of the invention shown in Figure 11 illustrating portions broken away to more clearly reveal the details of construction; and Figure 13 is a vertical cross-sectional view taken on line 13—13 of Figure 12 looking in the direction of the arrows showing a modified linkage structure between the locking sleeve and trailer prop.

*General construction and arrangement*

The invention consists of a locking sleeve concentrically arranged on the king pin of a tractor-trailer combination fifth wheel construction and slidable relative thereto to facilitate the locking of the king pin within the slot of the fifth wheel so that the king pin will not be accidentally displaced resulting in the uncoupling of the articulated assembly and causing considerable damage and possible loss of life. Further, the invention includes linkage connecting the trailer prop whereby the raising of the prop when the assembly is connected will effect the lowering of the locking sleeve to its operative position. Likewise, when the vehicle is at rest and the prop is lowered incident to the uncoupling of the assembly, the locking sleeve will be moved to its inoperative or elevated position to allow the tractor-trailer assembly to be uncoupled in the usual manner. By reason of the cooperation between the component coupling members, the centering of the locking sleeve is facilitated during the coupling operation of the tractor-trailer assembly. Whereby the locking sleeve will easily and readily be moved to its desired position dependent upon the movement of the trailer prop.

In the drawings, wherein for the purpose of illustrating the invention and wherein like reference characters will be employed to designate like parts throughout the same, attention is first directed to Figures 1 to 10 inclusive wherein the reference character 10 will generally be employed to designate a tractor chassis frame having a suitable rear spring suspension 11 for supporting a traction wheel 12. The trailer comprises a frame generally designated as at 13 and includes parallel side chassis bars 14 connected throughout their length by transverse channel irons 15, 16, 17, 18 and 19. In the rear portion of the trailer chassis 13 is provided spring suspension means for accommodating the usual rear wheels 21. The forward portion of the chassis 13 is offset as at 22 to provide a forwardly projecting portion 23 which is adapted to overlie the rear end of the tractor chassis 10.

Suitably trunnioned on the rear portion of the tractor chassis 10 is a tiltable fifth wheel ramp 24 and said ramp is provided with downwardly depending lugs 25 integrally formed at each side thereof providing bearing members. Mounted on each of the chassis frame bars 10 is a plate 26 held in place by U-bolts 27 extending around the chassis frame bars 10 so that the free ends may be received in lugs 28 formed on the plate 26 and held in place by nuts or the like threaded on the free ends thereof. The plate 26 is provided along its edges with upstanding flanges 30 between which is received the depending lugs 25 of the fifth wheel ramp 24. Suitable bearing bosses 31 are formed on the side flanges 30 and are adapted to receive a pivot pin 32 which extends through an opening in the lugs 25 whereby said platform 24 may rock or tilt rearwardly and forwardly. The tilting fifth wheel ramp 24 is provided with rearwardly extending wings 33 having inwardly converging walls 34 terminating in a slot 35. The slot 35 is enlarged as at 36 to provide a circular kingpin opening. Further, the tiltable fifth wheel platform 24 is provided with a marginal depending flange 37 to reinforce and strengthen the tiltable platform. The extreme rear ends of the wings 33 are inclined as at 38 to facilitate the guiding of the trailer chassis 13 into proper position for the coupling of the component coupling members.

Depending from the under surface of the tiltable fifth wheel platform 24 is a pair of oppositely disposed brackets 39 formed integral with the under surface and said brackets are connected by a bottom wall 40 having a circular recess or cut-away portion 41. Likewise formed on the under surface of the tiltable platform 24 is a pair of bearing bosses 42 on opposite sides of the circular king-pin opening 36 and said bearing bosses are adapted to receive bolts or the like as at 43 which extend through openings in the tiltable platform 24 and have their heads received in countersunk bores 44. The opposite ends of the bolts 43 extend through the connecting wall 40 and are provided with nuts or the like as at 45 threaded on the ends thereof. Pivotally mounted on each of the bolts 43 is a plate-like member 46 having arcuately-curved cutaway portions 47 providing king-pin retention jaws 48. The plate-like members 46 are pivoted so that the forward portions 49 may separate a distance sufficient to allow the king-pin to be moved into the slot 35 and thereby allow the kingpin to be moved into engagement with the retention jaws whereupon continued movement of the kingpin will effect the closing of the jaws therearound into the position shown in Fig. 4. Each of the plate-like members 46 is provided with a tail-piece 50 cut away as at 52 to provide a complementary notch for receiving a locking bolt 53. The locking bolt 53 is provided with a longitudinal slot 54 slidably received on an integral projection 55 depending from the bottom wall of the tiltable platform 24. A washer 56 is bolted or otherwise fastened in place by means of a screw 57 to facilitate the correct positioning of the locking bolt 53. The opposite end of the locking bolt is provided with an offset portion 57a terminating in a plunger 58 slidably received in an opening 59 in the marginal flange 37. A coil spring 60 has one end abutting the flange 37 while its opposite end is in abutting relation with the offset portion 57a of the bolt 53 to normally urge the end of the bolt 61 into engagement with the complementary notch 52, thereby holding the king-pin locking jaws 48 in engagement with the king-pin carried by the trailer which will hereinafter be more fully described.

A rock-lever 62 is pivoted to a pivot pin 63 formed integral with the under surface of the tiltable platform and one end of said rock lever is provided with an arm 64 having a slot 65 for receiving a pivot pin 66. The pivot pin 66 may be held in place by means of a transverse cotter key 67 as is clearly shown in Figure 6. The opposite end of the rock lever 62 is provided with an actuator lever 68 having a bifurcated end 69 for receiving the end of the rock lever 62 and said bifurcated portion 69 is securely fastened to the rock lever by means of a bolt or the like as at 70. The actuator lever 68 is provided with a handle portion 71 which projects through a notch in the marginal flange 37 so that the actuator lever may be accessible from a position on either side of the tractor chassis 10.

The forward portion of the trailer chassis 13 is provided on its under surface with a plate 72 extending between the transverse channel irons 18 and 19 and being preferably welded or otherwise secured thereto. The forward portion of the plate 72 is inclined upwardly as at 73 and is adapted to contactually engage the inclined surface 38 of the tiltable fifth wheel platform 24 when the trailer and tractor are being coupled or uncoupled. An opening 74 is centrally formed in the plate 72 and said opening is adapted to receive an annular flange 75 formed on a circular plate 76. The annular flange 75 may be secured within the opening 74 and held there by means of bolts or the like as at 77 extending through the circular plate 76 so that the free ends of the bolt 77 will be threaded in correspondingly threaded openings in the plate 72. Formed integral with the circular plate 76 is an annulus 78 having a cylindrical inner wall surface 79 in registry with the circular king pin receiving opening 36 in the tiltable fifth wheel platform 24. A king pin supporting sleeve 80 is mounted within the annulus 78 and is supported concentrically thereof by means of integrally formed connecting wings 81. The uppermost ends of the king-pin supporting sleeve is threaded as at 82 for receiving the upper threaded end of a king pin 83 as at 84. The king pin 83 projects downwardly and is provided with a head 85 adapted to underlie the king pin gripping jaws 48 as is best shown in Fig. 5. It is to be noted that the king pin 83 extends a considerable distance below the undersurface of the tiltable platform 24 so that the free end thereof will be in registry with the separable king pin engaging jaws 46. Likewise, the king pin supporting sleeve 80 extends downwardly a distance slightly greater than the annular flange 75 and said sleeve 80 is of a diameter slightly less than the distance between the walls of the slot 35 to facilitate the entrance of the sleeve 80 into the circular opening 36.

Slidably mounted between the annulus 78 and the king pin supporting sleeve 80 is a locking sleeve 86 and said sleeve is provided with longitudinal cutaway portions 87 defining diametrically opposed longitudinally extending slots 87. The longitudinal slots 87 are adapted to receive the diametrically opposed connecting wings 81 to allow the free reciprocable movement of the locking sleeve 86 into and out of the circular opening 36. Diametrically opposed bearing bosses 88 are formed on the locking sleeve 86 adjacent the top edge thereof and pivot pins 89 are fastened in said bosses by means of locking pins or the like as at 90. The circular plate 76 is provided with spaced upstanding ears 91 between which is pivotally supported a control member including a cylindrical portion 92 having formed integral with the ends thereof lever arms 93. The tubular member 92 is adapted to receive a supporting shaft 94 the free ends thereof extending through suitable openings 95 in the upstanding ears 91 so that the spaced arms 93 will rock in unison. The free ends of the arms 93 are provided with openings 96 for receiving the pivot pins 89 and said openings 96 are slotted to allow free play between the pivot pin 89 and the slot when the arms 93 are rocked on their shaft 94. Cotter keys or pins 97 are provided in the ends of the shaft 94 to securely hold said shaft in position and a set screw 98 is threaded in the upper end of the king pin supporting sleeve 80 so that the inner end of the set screw will engage the threaded portion 84 of the king pin and securely lock the same in position.

Formed integral with the tubular member 92 is an upstanding lug 99 adapted to receive a clevis 100 which is bolted in place by means of a bolt 101. The clevis 100 is provided with a rearwardly extending rod 102 so that the rear end of the rod may likewise be provided with a clevis 103 so that the rod may be coupled to a trip lever 104. Also projecting from the tubular portion 92 is a lug 105 which is engaged by a spring-pressed plunger 106 slidably received in a circular housing 107 formed integral with extension 108 on the circular plate 76.

The trip lever 104 is supported by a bracket 109 having a base portion 110 welded or otherwise secured to the transverse channel bar 17 and the free end of which bracket is provided with spaced bearings 111 between which is rockably mounted a bearing collar 112 formed on the upper end of the trip lever 104. The clevis 103 is bolted or otherwise secured to the intermediate portion of the trip lever 104 and a bearing pin 113 is adapted to pivotally support the trip lever by extending through the spaced bearing members 111 and through the bearing collar 112. The lower end of the trip lever is provided with an arcuately curved cam face 114 which is adapted to be engaged by an actuator lever which will be hereinafter more fully described.

Depending from the vertically offset portion 22 of each trailer chassis frame member 14 is a bracket 115 secured in place by rivets or the like and the lower ends of each bracket are provided with bearing bosses 116 for receiving a shaft 117. Pivotally mounted on the shaft 117 adjacent each end thereof is a prop bar 118 one end of which is provided with a collar 119 surrounding said shaft 117 so that free swinging movement of the prop bar 118 can be facilitated. Likewise, bearing bosses 120 are formed on the lower end of each prop bar 118 for supporting an axle 121 having wheels 122 rotatably mounted on the projecting ends thereof. The lower ends of the prop bar 118 may be connected by a tubular connecting bar 123 through which said axle 121 extends as is clearly shown in Fig. 1 and Fig. 2.

Each of the prop arms 118 is provided with a lug 125 for pivotally receiving the lower ends of converging guide bars 126 which may be integrally connected at their converging points so that a pivot pin 127 may connect said point to a sliding guide block 128 connected to a slide rod 129 guided in a conventional prop arm actuator 130 at one end and in a suitable opening in the transverse channel beam 15 at the opposite end.

Mounted intermediate the ends of the shaft 117 is a trip lever engaging finger 131 which is presented directly beneath the trip lever 104 so that the free end thereof will engage the arcuately curved surface 114 and thereby rock said trip lever, at the same time causing the movement of the rod 102 resulting in the elevation of the locking sleeve 86. It is to be noted that the collar 132 of the trip finger 131 is secured to the rock shaft 117 by means of a pin 133 and the bearings 119 of the prop arms 118 are similarly connected as by means of pins or the like as at 134 whereupon swinging motion of the prop arms 118 will effect the rocking motion of the shaft 117 with the result that the tripping finger 131 will be moved into and out of engagement and tripping relation with the tripping lever 104.

In operation, the trailer will be assumed to be unconnected from the tractor wherein the trailer will be normally supported by the prop arms 118 to cause the trailer to assume a horizontal position. When it is desired to couple the tractor and trailer, the tractor is moved rearwardly so that the tilting platform 24 is moved directly under the supporting plate 72. As this occurs, the king-pin 83 enters the converging slot 34 and upon continued rearward movement of the tractor, the king-pin is finally received in the circular opening 36 and is held spaced therefrom by means of the king-pin clamping jaws 46. When the actuator 130 is controlled to operate the slide rod 129, the props 118 will be moved to their unsupporting position, and during such movements the tripping finger 131 will move away from the tripping lever 104 and thereby allow the spring pressed plunger 106 to draw the rod 102 in a forward direction and allow the locking sleeve 86 to be moved downwardly so that the extreme lower end thereof will fill the space between the annulus 78 and the king-pin supporting sleeve 80 as is clearly shown in Figs. 4 and 5 so that said sleeve will enter the circular opening 36 in the tiltable platform 24. When uncoupling, it is only necessary to manipulate the actuator 130 to allow the slide rod 129 to move forwardly so that the props 118 will move downwardly until the ground-engaging wheels 122 engage the supporting surface and during such movement, the tripping finger 131 will engage the trip lever 104 and cause the rearward movement of the rod 102 thereby elevating the locking sleeve 86 so that the component coupling elements will then be disconnected by operating the actuator lever 68 to permit the separation of the king-pin engaging jaws 46 when the tractor is moved forwardly with respect to the trailer.

In the form of the invention shown in Figs. 11, 12 and 13, the trailer frame 13 is substantially identical to the trailer frame shown in Figs. 1 and 10 and includes the same spring suspension 20 for supporting the rear wheel and likewise, includes the chassis frame bars 14 connected by transverse channel bars 15, 16, 17, 18 and 19. The coupling elements are likewise the same and the difference of construction resides in a modified locking sleeve elevating member generally designated 132 supported by the upstanding ears 91 on the circular plate 76. The slotted arms 133 of the modified construction 132 are formed as individual members, said slotted arms are adapted to engage the diametrically opposed pins 89 on the locking sleeve 86 which is also identical to the form of the sleeve shown in Figs. 1 to 10 inclusive.

The modified construction 132 includes individual downwardly depending levers 134 to which is pivotally connected a clevis 135 as at 136. A reciprocating rod 137 is attached to the clevis as at 138. It is to be noted that the clevis 135 connects the free ends of the individual arms 134 so that movement of the clevis will effect the operation of the individual arms 133. The rod is threaded or otherwise secured in the enlargement 138 of the clevis as is clearly shown in Fig. 11.

The modification likewise includes a rock shaft 117 mounted in the same manner as the rock shaft shown in Figs. 1 to 10 inclusive and is supported in the same manner. A lever supporting bracket 109 is likewise fastened as by welding to the channel bar 17 for supporting a modified trip lever 139 to which one end of the rod 137 is connected by means of a suitable clevis 140 pivoted thereto as at 142. The lower end of the modified trip lever 139 is provided with a pair of oppositely extending jaws 143 and 144 for receiving the pin 145 of a modified trip finger 146. The trip finger 146 is secured to the rock shaft 117 which is identical to the shaft shown in Figs. 1 and 2 and is likewise intended to support the prop lever 118 and the ground engaging wheels 122. The slidable actuator 126 is connected to a clamp 128 fastened to the rod 129 which forms one end of a plunger operably mounted in the actuator 130 and the props 118 are likewise operative to their extreme positions in the same manner as shown in the form of the invention in Figs. 1 to 10 inclusive. The modified trip finger 146 has its hub 147 securely fastened to the shaft 117 by means of a pin 148 and it is to be noted that by reason of the curved surface 149 between the opposed jaws 143 and 144 that rocking movement of the prop arms 118 will positively operate the reciprocating rod 137 thereby causing a locking sleeve 86 to likewise be positively operative between its extreme positions. Further, it is to be noted that the modified form of the invention shown in Figs. 11 to 13 inclusive does not rely upon the use of coil springs or a spring pressed lever projection 105 as is shown in the form of the invention illustrated in Figs. 1 to 10 inclusive.

When the prop levers 118 are lowered in the modified form of the invention, the pin 145 operates between the opposed jaws 143 and 144 to cause the trip lever 139 to rock or swing on its pivot pin carried by the bracket 109. By reason of the fact that the pin 145 more or less follows the curvature 149 of the trip lever, the raising or lowering of the prop levers 118 will operate the trip lever and the reciprocating rod 137 to effect the positive lifting or lowering of the locking sleeve 86.

It is to be understood that the form of the invention herewith shown and described are to be taken as preferred embodiments hereof and that various changes in the shape, size and arrangement of parts may be resorted to without departing from the spirit of the invention or the scope of the subjoined claims.

What I claim is:

1. A tractor trailer assembly having component coupling elements including a king pin for being received in a key hole slot in a fifth wheel member, a locking member carried by and concentric with one of said elements to engage the other of said coupling elements and lock the tractor trailer in coupled relation said locking member being adapted to close said key hole slot against the removal of the king pin and mechanism carried by and operable from the trailer for moving the locking member to its operative and inoperative positions.

2. A tractor trailer assembly having component coupling elements including a king pin and a slotted fifth wheel member, a slidable cylindrical locking member associated with one of the component coupling elements for reception in said slot in the other element to retain the assembly in coupled relation and trailer supporting mechanism on the trailer operably connected to said locking member for sliding the locking member to an inopertive position upon movement of said supporting mechanism to an operative position.

3. A tractor trailer assembly having component coupling elements including a king pin and a keyhole slotted fifth wheel member adapted to be separably connected, a locking member slidably carried by and concentric with one of the elements for reception in said slot in the other element to maintain the component coupling elements in a locked position, and mechanism operable preparatory to the uncoupling of said tractor-trailer assembly connected to said locking member for moving the locking member to an unlocked position.

4. A tractor trailer assembly having component coupling elements including a king pin and a keyhole slotted fifth wheel member for separably connecting said assembly, an auxiliary locking sleeve slidably carried by and concentric with one of said component coupling elements adapted to engage within the key hole slot in the other component element and mechanism operably connecting said locking member carried by the trailer for moving the locking sleeve into and out of engagement with said coupling element.

5. A tractor trailer assembly having component coupling elements for retaining the assembly separably connected, a slidable concentric sleeve carried by one of said component elements, and means on the trailer for moving said sleeve into and out of engagement with the other coupling element whereby the load of the component coupling elements will be transmitted to the concentric sleeve.

6. A tractor trailer assembly having component coupling elements for separably connecting the assembly, a concentric locking sleeve slidably mounted on one of said coupling elements for being moved into the path of the other coupling element and means located on the trailer for moving the locking sleeve to and from its locking position.

7. A tractor trailer assembly having component coupling elements including a king pin and a slotted fifth wheel member for separably connecting the assembly, a locking sleeve carried by one of said coupling elements movable into and out of engagement with the key hole slot in the other coupling element and an actuator adjacent the coupling elements for moving the sleeve to its operative and inoperative positions.

8. A tractor trailer assembly having component coupling elements providing a separable fifth wheel construction, a locking sleeve adapted to be carried by one of the elements whereby stresses and strains will be transmitted to the locking sleeve and an actuator adjacent said sleeve to cause the sleeve to be moved into and out of registry between said component coupling elements.

9. A tractor trailer combination having separably connected component coupling elements, a locking sleeve slidably carried by one of said component coupling elements adapted to be moved into and out of an opening in the other element and an actuator adjacent the coupling elements for operating the locking sleeve.

10. A tractor trailer combination having separably connected component coupling elements, one of said elements comprising a king pin, a locking sleeve slidably mounted on the king pin for movement into and out of an opening in the other component coupling element and an actuator for moving the locking sleeve to its operative position from its inoperative position.

11. In combination with a tractor trailer vehicle having a fifth wheel assembly including component pin and slot coupling elements and a prop for the tractor, a locking sleeve slidably carried by one of the coupling elements adapted to be received in the slot in the other coupling element and an actuator controlled by the trailer prop for moving the locking sleeve to its operative and inoperative positions.

12. In combination with a tractor trailer vehicle having a fifth wheel assembly and a prop for supporting the trailer in a horizontal position, a locking member carried by the fifth wheel to lock the assembly in coupled relation and means operable by the movement of the prop for controlling the locking member.

13. In combination with a tractor trailer vehicle having component king pin and slot coupling elements separably connected and a prop for holding the trailer in a horizontal position when disconnected from the tractor, a locking member associated with one of the component coupling elements for closing said slot in the other component coupling elements and an actuator controlled by the elevation of the prop to move the locking member to an unlocking position.

14. In combination with a tractor trailer vehicle having a pin and slot fifth wheel coupling and a ground engaging prop for maintaining the trailer in a horizontal position when uncoupled from the tractor, a locking member associated with the fifth wheel coupling adapted to be moved from a locked position between said pin and slot to an unlocked position free of said pin and slot and linkage connecting the ground engaging prop with the locking member whereby movement of the prop will effect movement of the locking member.

15. In combination with a tractor trailer vehicle having a fifth wheel construction including separably connected component coupling elements and a ground engaging prop for maintaining the trailer in a horizontal position when uncoupled from the tractor, a locking sleeve interposed between the component coupling elements for slidable movement relative thereto, and linkage connecting the ground engaging prop with the locking sleeve to cause said sleeve to be moved into and out of its operative position upon the raising and lowering of the ground engaging prop.

16. In combination with a tractor trailer vehicle having a fifth wheel construction including separably connected component coupling elements, a locking member associated with one of the coupling elements movable toward and away from the other coupling element and adapted to be interposed between said component coupling element and an actuator for said locking member.

17. In combination with a tractor trailer vehicle having component coupling elements wherein one of said elements constitutes a king pin, a locking sleeve reciprocably mounted on said king pin adapted to be moved to a position between the king pin and the other component coupling element and an actuator for said locking sleeve carried by the trailer.

SIDNEY B. WINN.